United States Patent [19]

Kashiyama

[11] Patent Number: 4,965,481

[45] Date of Patent: Oct. 23, 1990

[54] DRIVE CIRCUIT FOR VIBRATORY-WAVE MOTOR

[75] Inventor: Ritsuo Kashiyama, Kanagawa, Japan

[73] Assignee: Canon Kabushiki Kaisha, Tokyo, Japan

[21] Appl. No.: 355,834

[22] Filed: May 22, 1989

Related U.S. Application Data

[63] Continuation of Ser. No. 254,854, Oct. 7, 1988, abandoned.

[30] Foreign Application Priority Data

Oct. 20, 1987 [JP] Japan ................................ 62-265705

[51] Int. Cl.$^5$ ............................................. H01L 41/08
[52] U.S. Cl. ..................................... 310/316; 318/116
[58] Field of Search .............. 310/316, 317, 323, 328; 318/116

[56] References Cited

U.S. PATENT DOCUMENTS

| | | | |
|---|---|---|---|
| 4,484,099 | 11/1984 | Kawai et al. | 310/317 |
| 4,491,401 | 1/1985 | Inaba et al. | 354/271.1 |
| 4,495,432 | 1/1985 | Katsuma et al. | 310/328 |
| 4,504,760 | 3/1985 | Yamamoto et al. | 310/323 |
| 4,510,411 | 4/1985 | Hakamata et al. | 310/323 X |
| 4,560,263 | 12/1985 | Katsuma et al. | 354/195.1 |
| 4,587,452 | 5/1986 | Okumura et al. | 310/328 |
| 4,634,915 | 1/1987 | Mukoujima et al. | 310/323 |
| 4,658,172 | 4/1987 | Isukawa | 310/316 |
| 4,660,933 | 4/1987 | Notagashira et al. | 350/255 |
| 4,692,672 | 9/1987 | Okuno | 318/116 |
| 4,713,571 | 12/1987 | Suzuki et al. | 310/316 |
| 4,727,276 | 2/1988 | Isukawa et al. | 310/316 |
| 4,743,788 | 5/1988 | Takagi et al. | 310/323 X |
| 4,749,896 | 6/1988 | Suzuki et al. | 310/316 |

*Primary Examiner*—Mark O. Budd
*Attorney, Agent, or Firm*—Fitzpatrick, Cella, Harper & Scinto

[57] ABSTRACT

In a drive circuit for a vibratory-wave motor, there is provided a changeover circuit for alternately changing over a direction in which a current is supplied to a primary coil of a transformer in response to a frequency signal, a low-voltage power source is used as a power source of the changeover circuit, and a low voltage is boosted by the switching operation of the changeover circuit to obtain a frequency high voltage for driving the vibratory-wave motor.

15 Claims, 2 Drawing Sheets

DRIVE CIRCUIT FOR VIBRATORY-WAVE MOTOR

This application is a continuation of application Ser. No. 07/254,854 filed Oct. 7, 1988, now abandoned.

BACKGROUND OF THE INVENTION

1. Field of the Invention:

This invention relates to a drive circuit for a vibratory-wave motor.

2. Description of the Related Art:

To drive the vibratory-wave motor, two AC high-frequency voltages of high level (about 100 $V_{p-p}$) with the phase difference of $\pi/2$ are necessary. In the case of driving the vibratory-wave motor by a low-voltage power source (battery, etc.), therefore, it is required that a high-voltage DC power source is made up by using a DC/DC converter, which is operated by switching to obtain an AC high voltage for driving. The DC/DC converter, however, has many constituent parts and is poor in conversion efficiency.

SUMMARY OF THE INVENTION

One aspect of the application is to provide a drive circuit for a vibratory-wave motor which is constructed in a very simple form by employing a boosting circuit of the type in which voltage boosting is effected by switching a low voltage, and such drive circuit has high conversion efficiency when driving the vibratory-wave motor.

Another aspect of the application is to provide a drive circuit for driving a vibratory-wave motor by obtaining a high-frequency high voltage in such a way that the output of a low-voltage circuit is connected to a switching circuit comprised of two pairs of switching means and a transformer is connected between a junction point of one of the two pairs of switching means and a junction point of another of the two pairs of switching means so that the direction of the current flowing to the transformer is alternately changed over by the switching operation of the switching circuit.

Other aspects of the present invention will become apparent from the following description of an embodiment thereof by using the drawings.

DETAILED DESCRIPTION OF THE PREFERRED EMBODIMENT

Figure 1:
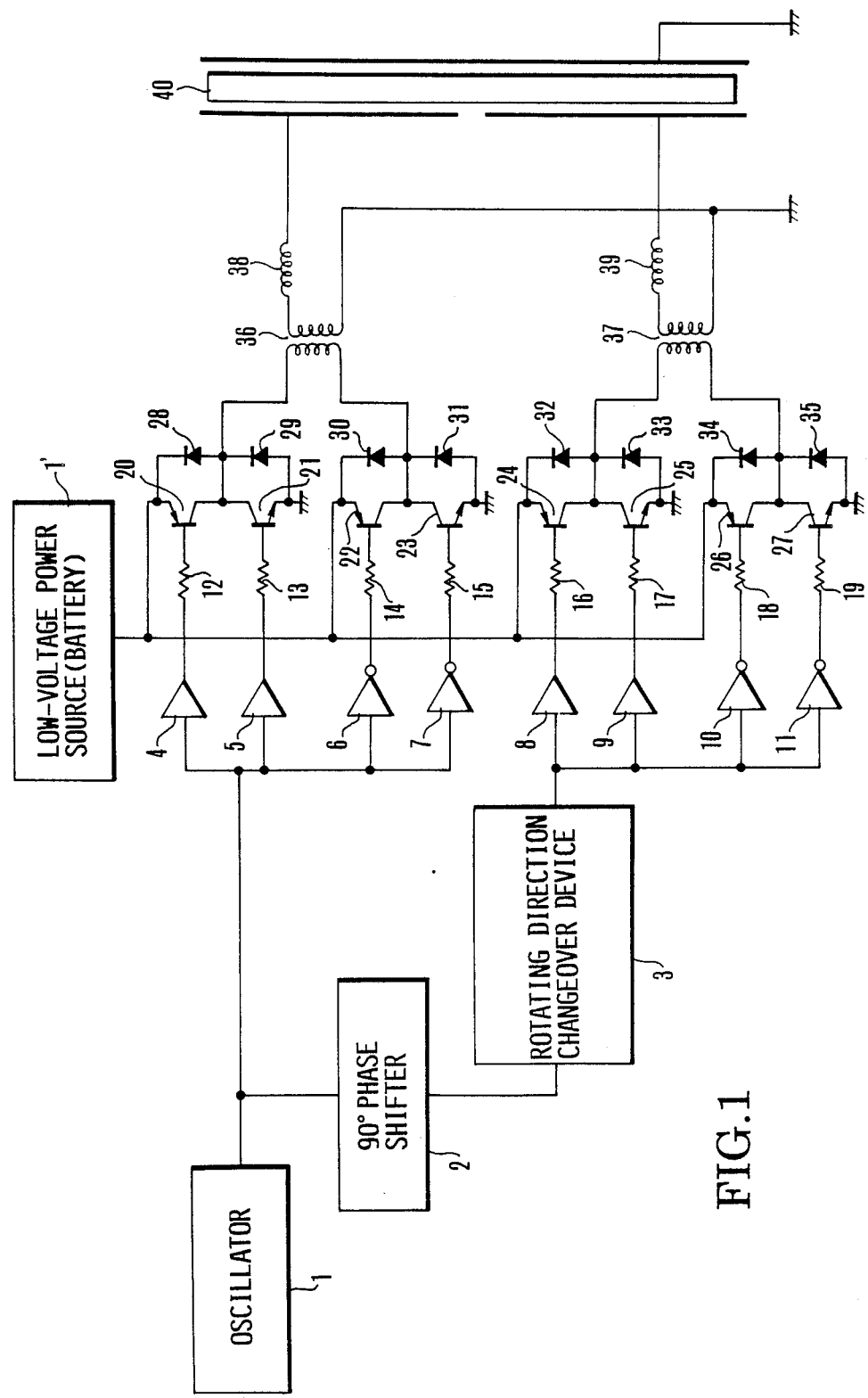
FIG. 1 is an electrical circuit diagram illustrating an embodiment of a drive circuit for a vibratory-wave motor according to the invention.

FIG. 1 in electrical circuit diagram shows one embodiment of the drive circuit for the vibratory-wave motor according to the invention. In the figure, 1 is an oscillator for generating a high-frequency signal for driving a vibratory-wave motor 40; 2 is a phase shifter for shifting 90° the phase of the output of the oscillator 1 to form a high-frequency signal for driving of 90° phase difference; 3 is a rotating direction changeover device for changing the direction of rotation of the vibratory-wave motor 40; 4, 5, 8 and 9 are buffers for driving transistors 20, 21, 24 and 25 for switching; 6, 7, 10 and 11 are buffers for driving transistors 22, 23, 26 and 27 at the reversed phase; 12–19 are resistors connected to the bases of transistors 20–27; 20–27 are the transistors for switching; 28–35 are protection diodes for protecting the transistors 20–27 from the counter electromotive force of transformers 36 and 37; 36 and 37 are the boosting transformers for boosting a high-frequency low voltage for driving to make up a high-frequency high voltage for driving; 38 and 39 are wave form shaping coils for shaping the boosted high frequency into a sine wave; 40 is a vibratory-wave motor to be driven by the high-frequency high voltage.

The structure of this vibratory-wave motor itself is publicly known as disclosed in Japanese Laid-Open Patent Application No. Sho 59-156169 and others. Therefore its detailed explanation is omitted. Yet, first and second groups of electrostrictive elements (piezoelectric elements) are arranged on the surface of a vibrator in a phase difference, and high-frequency voltages of 90° phase difference are applied to the groups of electrostrictive elements to form a progressive vibratory wave on their surfaces. By this vibratory wave, a rotor pressed on the surface of the vibrator is driven to move.

Next, the operation of such arrangements is described. The high-frequency signal generated in the oscillator 1 is 90° shifted by the phase shifter 2 to form a high-frequency signal of the same frequency with a phase difference of 90° for driving the vibratory-wave motor 40. By the rotating direction changeover device 3, whether to advance or delay the phase difference by 90° in coincidence with the normal or reverse rotation of the vibratory-wave motor 40 is determined. It should be noted that when the direction of rotation is limited to only one of the normal and reverse rotations, the output of the phase shifter 2 is directly transmitted to the buffers 8 and 9 and the inverters 10 and 11 to be described later.

Then, these two high-frequency signals of 90° phase difference are supplied through the buffers 4–11 to the bases of the switching transistors 20–27, thus becoming signals for switching.

Figure 2:
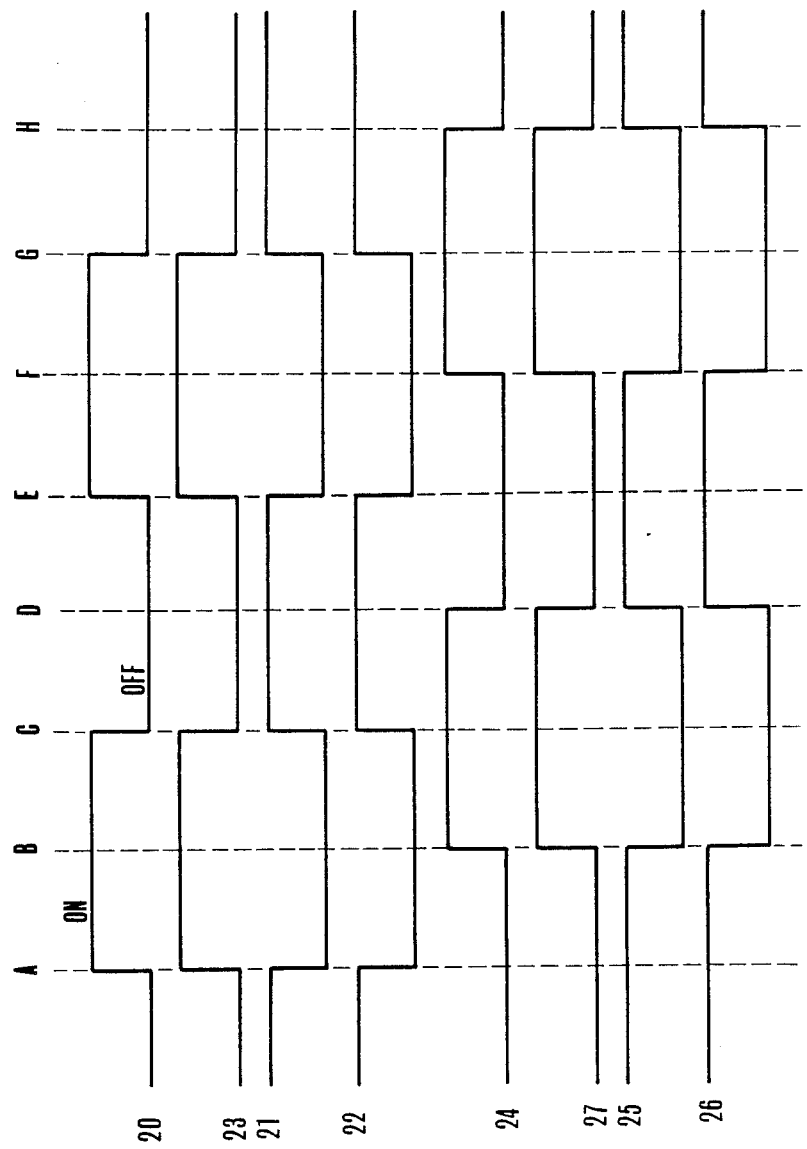
FIG. 2 is wave forms to explain the operation of the circuit of FIG. 1.

Now, the transistor 20 is assumed to be turned on by the high-frequency signal input through the buffer 4. In this state, the transistor 21 is turned off. Also, because the transistors 22, 23 and are driven by the reversed signal, the transistor 22 is turned off and the transistor 23 is turned on. Under this condition, the current which is supplied from a low-voltage power source 1' flows from the transistor 20 to the primary coil of the transformer 36, and, then, to the transistor 23. Also, when the phase of the high-frequency signal is reverse, the current flows from the transistor 22 to the primary coil of the transformer 36, and, then, to the transistor 21, so that a high-frequency low voltage is put on the primary coil side of the transformer 36. The direction of the current flowing to the transformer 36 is controlled to be periodically reversed. Hence, a high-frequency high voltage sufficient for driving the vibratory-wave motor 40 is generated on the secondary coil side of the transformer 36. Incidentally, the operating states of the transistors 20–23 are shown in FIG. 2.

Meanwhile, the transistors 24–27 are driven by a high-frequency signal of different phase by 90° from that of the high-frequency signal generated by the oscillator 1 as has been described above. Therefore, as shown by 24–27 of FIG. 2, the transistors 24–27 operate in the phase difference of 90° relative to the above-described transistors 20–23, and a high-frequency high voltage whose phase differs 90° from that of the high-frequency high voltage generated on the secondary coil side of the transformer 36 is generated on the secondary coil side of the transformer 37.

The thus-generated high-frequency high voltages with 90° phase difference are shaped into sine waves through the coils 38 and 39 respectively, being applied through electrodes to each group of electrostrictive elements arranged on the surface of the vibratory-wave motor 40 in a phase differing relation. Thereby, a progressive vibratory wave is raised on the surface of the vibrator. Thus, the rotor rotates.

It should be noted that though in the embodiment the electrostrictive elements are used, other electromechanical energy conversion elements (for example, piezoelectric substance) may be used instead.

What is claimed is:

1. A drive circuit for a vibratory-wave motor which produces a driving force of a progressive vibratory wave formed by applying frequency voltages of different phases respectively to a first electro-mechanical energy conversion element portion arranged at a first position on a first member and a second electro-mechanical energy conversion element portion arranged at a second position on the first member, said drive circuit comprising:
   (a) a frequency signal forming circuit for forming a frequency signal of a predetermined period;
   (b) a shifting circuit for outputting a frequency signal shifted by a predetermined phase from the frequency signal output from said frequency signal forming circuit;
   (c) a first transformer for boosting an output of a power source circuit, an output of said first transformer serving as the frequency voltage applied to the first conversion element portion;
   (d) a second transformer for boosting the output of said power source circuit, an output of said second transformer serving as the frequency voltage applied to the second conversion element portion;
   (e) a first current supply control circuit responsive to the frequency signal output from said frequency signal forming circuit for alternately forming first and second current paths, the first current path connecting a first terminal of a primary coil of said first transformer to a first output terminal of said power source circuit and connecting a second terminal of said primary coil of said first transformer to a second output terminal of said power source circuit to allow a current to flow from said first terminal to said second terminal of said primary coil of said first transformer, and the second current path connecting said first terminal of said primary coil of said first transformer to said second output terminal of said power source circuit and connecting said second terminal of said primary coil of said first transformer to said first output terminal of said power source circuit to allow a current to flow from said second terminal to said first terminal of said primary coil of said first transformer; and
   (f) a second current supply control circuit responsive to the frequency signal output from said shifting circuit for alternately forming first and second current paths, the first current path of said second current supply control circuit connecting a first terminal of a primary coil of said second transformer to said first output terminal of said power source circuit and connecting a second terminal of said primary coil of said second transformer to said second output terminal of said power source circuit to allow a current to flow from said first terminal to said second terminal of said primary coil of said second transformer, and the second current path of said second current supply control circuit connecting said first terminal of said primary coil of said second transformer to said second output terminal of said power source circuit and connecting said second terminal of said primary coil of said second transformer to said first output terminal of said power source circuit to allow a current to flow from said second terminal to said first terminal of said primary coil of said second transformer.

2. A drive circuit according to claim 1, wherein said first output terminal of said power source circuit is a positive potential output terminal, and wherein said second output terminal in one of a negative potential and a ground output terminal.

3. A drive circuit according to claim 1, wherein the electro-mechanical energy conversion element portions are electrostrictive element portions.

4. A drive circuit according to claim 1, wherein the electro-mechanical energy conversion portions are piezoelectric element portions.

5. A drive circuit for a vibratory-wave motor which produces a driving force of a progressive vibratory wave formed by applying frequency voltages of different phases respectively to a first electro-mechanical energy conversion element portion arranged at a first position on a first member and a second electro-mechanical energy conversion element portion arranged at a second position on the first member, said drive circuit comprising:
   (a) a frequency signal forming circuit for forming a frequency signal of a predetermined period;
   (b) a shifting circuit for outputting a frequency signal shifted by a predetermined phase from the frequency signal output from said frequency signal forming circuit;
   (c) a first transformer for boosting an output of a power source circuit, an output of said first transformer serving as the frequency voltage applied to the first conversion element portion;
   (d) a second transformer for boosting the output of said power source circuit, an output of said second transformer serving as the frequency voltage applied to the second conversion element portion;
   (e) a first changeover circuit responsive to the frequency signal output from said frequency signal forming circuit for changing over a direction in which a current is supplied to a primary coil of said first transformer, said first changeover circuit including first and second switching means connected in series and adapted to be arranged such that when one of said first and second switching means is turned on the other of said first and second switching means is turned off and third and fourth switching means connected in series and adapted to be arranged such that when one of said third and fourth switching means, is turned on the other of said third and fourth switching means is turned off, said third switching means being adapted to be turned off when said first switching means is turned on, said primary coil of said first transformer being connected between a junction point of said first and said second switching means and a junction point of said third and fourth switching means, a first output terminal of said power source circuit being connected to said first and third switching means, and a second output terminal of said power source circuit being connected to said second and fourth switching means; and (f) a second changeover circuit responsive to the frequency signal output from said shifting circuit for changing over a direction in which a current is supplied to a primary coil of said second transformer, said second changeover circuit including first and second switching means connected in series and adapted to be arranged such that when one of said first and second switching means is turned on the other of said first and second switching means is turned off and third and fourth switching means connected in series and adapted to be arranged such that when one of said third and fourth switching means is turned on the other of said third and fourth switching means is turned off, said third switching means being adapted to be turned off when said first switching means is turned on, said primary coil of said second transformer being connected between a junction point of said first and second switching means of said second changeover circuit and a junction point of said third and fourth switching means of said second changeover circuit, said first output terminal of said power source circuit being connected to said first and third switching means of said second changeover circuit, and said second output terminal of said power source circuit being connected to said second and fourth switching means of said second changeover circuit.

6. A drive circuit according to claim 5, wherein said first output terminal of said power source circuit is a positive potential output terminal, and wherein said second output terminal is one of a negative potential and a ground output terminal.

7. A drive circuit according to claim 5, wherein the electro-mechanical energy conversion element portions are electrostrictive element portions.

8. A drive circuit according to claim 5, wherein the electro-mechanical energy conversion portions are piezoelectric element portions.

9. A drive circuit according to claim 5, wherein said frequency signal forming circuit is a pulse forming circuit for producing pulses of a predetermined period.

10. A drive circuit for a vibratory-wave motor which produces a driving force of a progressive vibratory wave by applying a frequency signal to an electro-mechanical energy conversion element portion arranged on a first member, said drive circuit comprising:
(a) a frequency signal forming circuit for forming a frequency signal of a predetermined period;
(b) a transformer for boosting an output of a power source circuit, an output of said transformer serving as the frequency signal applied to the conversion element portion; and
(c) a current supply control circuit responsive to the frequency signal output from said frequency signal forming circuit for alternately forming first and second current paths, the first current path connecting a first terminal of a primary coil of said transformer to a first output terminal of said power source circuit and connecting a second terminal of said primary coil of said transformer to a second output terminal of said power source circuit to allow a current to flow from said first terminal to said second terminal of said primary coil of said transformer, and the second current path connecting said first terminal of said primary coil of said transformer to said second output terminal of said power source circuit and connecting said second terminal of said primary coil of said transformer to said first output terminal of said power source circuit to allow a current to flow from said second terminal to said first terminal of said primary coil of said transformer.

11. A drive circuit according to claim 10, wherein said first output terminal of said power source circuit is a positive potential output terminal, and wherein said second output terminal is one of a negative potential and a ground output terminal.

12. A drive circuit according to claim 10, wherein the electro-mechanical energy conversion element portion is an electrostrictive element portion.

13. A drive circuit according to claim 10, wherein the electro-mechanical energy conversion portion is a piezoelectric element portion.

14. A drive circuit for a vibratory-wave motor which produces a driving force of a progressive vibratory wave by applying a frequency signal to an electormechanical energy conversion element portion arranged on a first member, said drive circuit comprising:
(a) a frequency signal forming circuit for forming a frequency signal of a predetermined period;
(b) a transformer for boosting an output of a power source circuit, an output of said transformer serving as the frequency signal applied to the conversion element portion; and
(c) a changeover circuit responsive to the frequency signal output from said frequency signal forming circuit for changing over a direction in which a current is supplied to a primary coil of said transformer, said changeover circuit including first and second switching means connected in series and adapted to be arranged such that when one of said first and second switching means is turned on the other one of said first and second switching means is turned off and third and fourth switching means connected in series and adapted to be arranged such that when one of said third and fourth switching means is turned on the other one of said third and fourth switching means is turned off, said third switching means being adapted to be turned off when said first switching means is turned on, said primary coil of said transformer being connected between a junction point of said first and second switching means and a junction point of said third and fourth switching means, a first output terminal of said power source circuit being connected to said first and third switching means, an a second output terminal of said power source circuit being connected to said second and fourth switching means.

15. A drive circuit for a vibratory-wave motor which produces a driving force of a progressive vibratory wave by applying a frequency signal to an electro-mechanical energy conversion element portion arranged on a first member, said drive circuit comprising:
(a) a frequency signal forming circuit for forming a frequency signal of a predetermined period;
(b) a transformer for boosting an output of a power source circuit, an output of said transformer serving as the frequency signal applied to the conversion element portion; and
(c) a change-over circuit which alternately changes the direction of the current flowing in the primary coil of said transformer in response to a frequency signal output from said frequency signal forming circuit, the current flowing in said primary coil being supplied from said power source circuit.

* * * * *